United States Patent [19]

Engeler et al.

[11] Patent Number: 5,402,684
[45] Date of Patent: Apr. 4, 1995

[54] MULTICOMPONENT FORCE AND MOMENT MEASURING ARRANGEMENT

[75] Inventors: Paul Engeler, Frauenfeld; Mario, Giorgetta, Winterthur, both of Switzerland

[73] Assignee: K.K. Holding AG, Switzerland

[21] Appl. No.: 139,028

[22] Filed: Oct. 21, 1993

[30] Foreign Application Priority Data

Oct. 23, 1992 [CH] Switzerland .............. 03292/92

[51] Int. Cl.⁶ .................................................. G01N 3/08
[52] U.S. Cl. ................................................... 73/794
[58] Field of Search ........................................ 73/794

[56] References Cited

U.S. PATENT DOCUMENTS

| | | | |
|---|---|---|---|
| 3,614,488 | 10/1971 | Sonderegger et al. | 73/794 |
| 4,103,542 | 8/1978 | Wheeler et al. | 73/105 |
| 4,586,377 | 5/1986 | Schmid | 73/517 R |
| 4,607,531 | 8/1986 | Meline et al. | 73/794 |
| 4,841,256 | 6/1989 | Gastgeb | 331/25 |
| 4,876,524 | 10/1989 | Jenkins | 338/2 |
| 5,003,827 | 4/1991 | Kalinoski et al. | 73/861.24 |

*Primary Examiner*—Richard E. Chilcot, Jr.
*Assistant Examiner*—James M. Olsen
*Attorney, Agent, or Firm*—Barnes & Thornburg

[57] ABSTRACT

A multicomponent force and moment measuring arrangement wherein shear forces are converted into moments and transmitted via tensile-compressive forces onto piezoelectric rod elements, while axial compressive-tensile forces are transmitted directly onto the same piezoelectric rod elements. With appropriate arrangement of the piezoelectric rods and their signal evaluation, transducers and dynamometers of entirely new type can be constructed, in which the necessary electronics package can be located between the piezoelectric rod elements for certain applications.

16 Claims, 4 Drawing Sheets

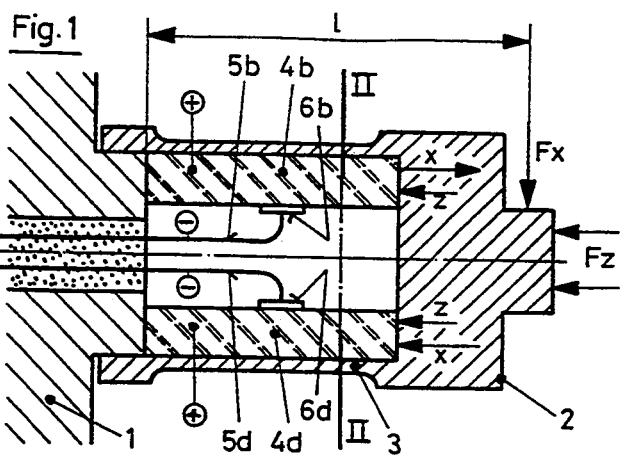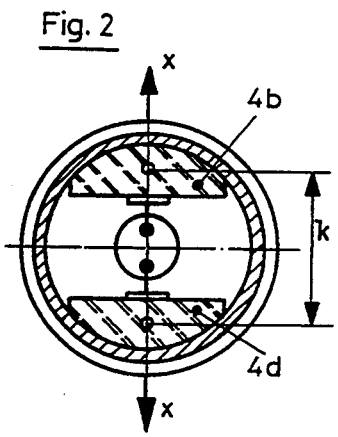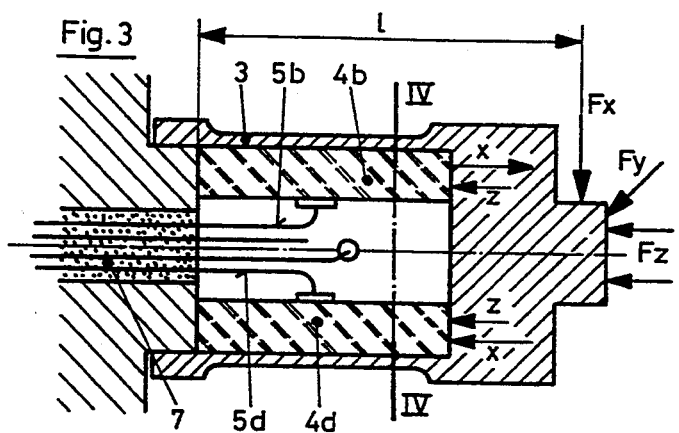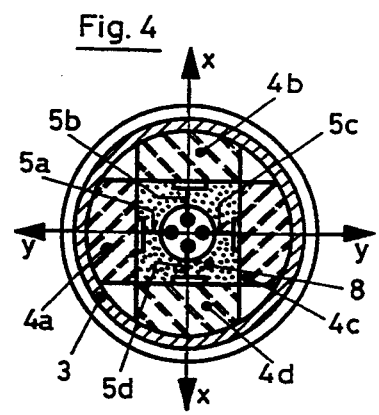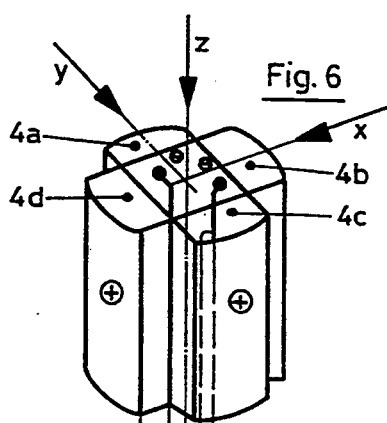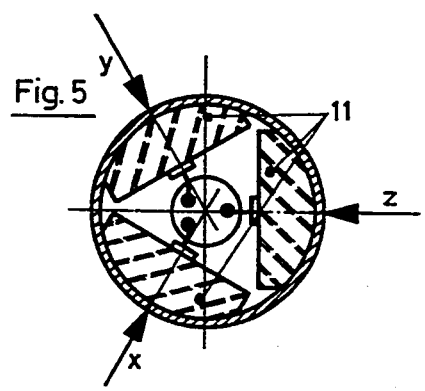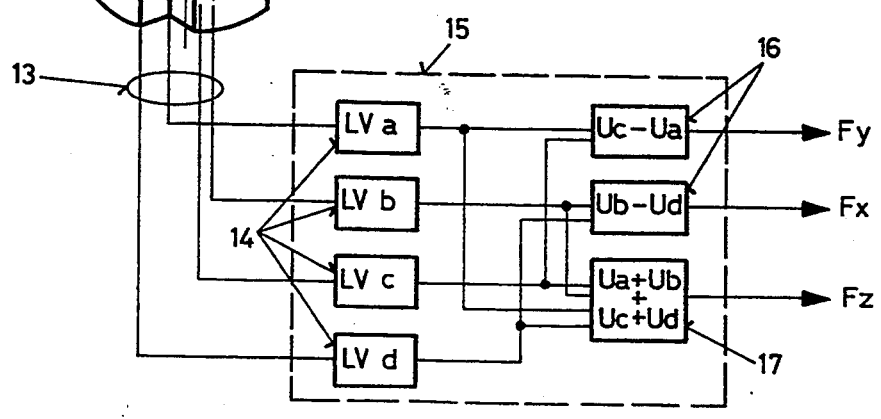

MULTICOMPONENT FORCE AND MOMENT MEASURING ARRANGEMENT

BACKGROUND AND SUMMARY OF THE INVENTION

Multicomponent force measuring by means of dynamometers and with flat washer sensors is familiar. For such applications piezoelectric metrology employing quartz load washers for compressive and shear loading has gained acceptance. The quartz crystal disks used for this are all cut longitudinally from the quartz rods. Piezoelectric ceramics might be used in principle, though they have not found acceptance because static calibration is necessary.

Also known in piezoelectric pressure transducers are piezoelectric crystals as rod elements cut transversely.

The invention is based on the new discovery that such piezoelectric rod elements may be employed for forming flexural moment, making possible multicomponent force measurement provided their signals are processed appropriately. Such force and moment transducers can be made very compact and simple. They are suitable for miniaturization, because the signal strength is many times greater than that with disk crystal arrays.

A measuring arrangement according to the invention is characterized by at least two piezoelectric elements sensitive to compression and tension respectively, with a common force introducing element, being disposed so that they measure both pressure and tension components, and also add or subtract as the case may be compressive or tensile forces set up in pairs by moment forces, resulting in the piezoelectric elements from one or more moments acting on the measuring arrangement, whereby the addends are led as signal charges to evaluation circuitry.

The invention and other features and advantages associated with it are explained in more detail below, with reference to the typical embodiments illustrated in the drawing.

BRIEF DESCRIPTION OF THE DRAWINGS

FIG. 1 Section through a multicomponent force and moment measuring arrangement according to the invention.

FIG. 2 Cross section at the line II—II in FIG. 1.

FIG. 3 Section through a measuring arrangement according to the invention with two piezoelectric rod element pairs.

FIG. 4 Cross section at the line IV—IV in FIG. 3.

FIG. 5 Cross section through a measuring arrangement with three piezoelectric rod elements.

FIG. 6 Evaluation circuitry for a three-component crystal set according to FIGS. 3 and 4.

DETAILED DESCRIPTION OF THE DRAWINGS

Figure 7:
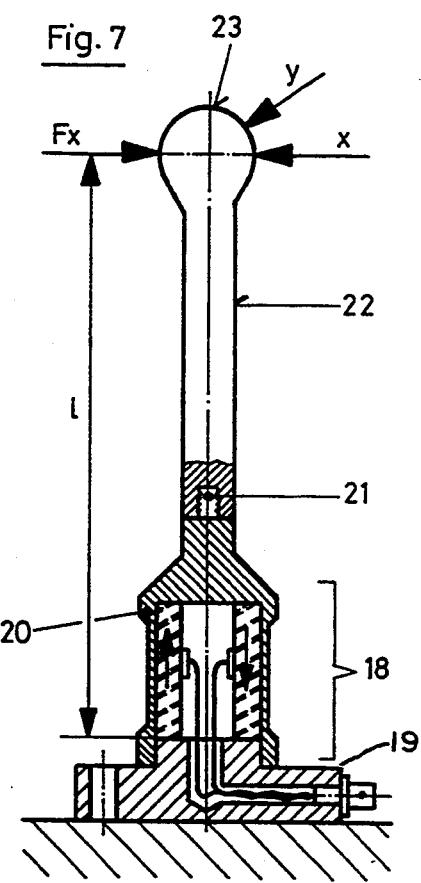
FIG. 7 Use of a measuring arrangement according to the invention as joystick control element.

The measuring arrangement according to FIGS. 1 and 2 consists of the body 1 and the top plate 2, which is extended as an elastic clamping sleeve 3 surrounding the crystal pair 4b, 4d, under mechanical preload and joined rigidly to the body 1. The crystal pair 4b, 4d consists of two rod crystals of typically segmental cross section (FIG. 2). The crystal rods are cut transversely out of the piezoelectric material. Quartz is used preferably as piezoelectric material, though other suitable materials may be employed also. Piezoelectric ceramics too can be processed into such piezoelectric rods. Moreover piezoresistive rods may be used as piezoelectric elements as well.

The crystal pair 4b, 4d is fitted so that rod 4d is loaded under the action of a force Ft, while rod 4b is unloaded, because the rods are placed under mechanical preload when assembling them. In the transverse section, the crystal rods are polarized so that under loading they give off the negative charges on the plane-ground inner segment surfaces to the contact points 6b, 6d of the electrodes 5b, 5d, while the positive charges at the cylindrical outer surfaces are led off straight to the clamping sleeve 3.

Depending on the application, crystal pairs of like or unlike polarity may be used. FIG. 1 shows a crystal pair 4b, 4d of unlike polarity, i.e. negative charges occur at both contact points 6b, 6d under loading. If for example only Ft moments are to be measured, a crystal pair of unlike polarity is of advantage, because with a common electrode not shown, which picks up the charges of both contact surfaces, a charge addition results automatically for both crystal rods.

The force Ft sets up a flexural moment through the lever arm l, which in the crystal pair 4b, 4d causes a countermoment with unloading-loading forces via the distance k along its center of gravity. In addition to the flexural force Ft, a positive axial force Fz acts directly on the crystal pair. This axial force or axial moment of a force of any direction could also be opposed, i.e. negatively directed.

In the two crystal rods a vector addition takes place automatically of the forces x and z, which are represented as Ft and Fz in the subsequent electronic processing, as will be shown in connection with FIG. 6.

FIGS. 3 and 4 show an arrangement similar to FIGS. 1 and 2. To enable measurement of force moments in the y direction too, a second crystal pair 4a, 4c is used. In order to ensure perfect contact for charge delivery, the crystal rods, again with segmental cross section, are pressed onto the wall of the clamping sleeve 3 by an insulating filler 8 shown only in FIG. 4. All inner surfaces of the crystal rods are contacted by separate electrodes leading through the insulator 7 into the connecting cable. With this arrangement, two orthogonal moment forces Ft and Fy can now be measured besides the axial forces Fz.

FIG. 5 shows a delta-shaped crystal rod arrangement 11 suitable for special, non-orthogonal force directions.

With this embodiment, only parts of neighbouring crystal rods are allocated to each other in pairs.

FIG. 6 shows the crystal assembly 4, comprising the individual crystals 4a, 4b, 4c and 4d, with the help of which the signals from the individual crystal rods are processed. The individual rods are stressed only in compression or tension as the case may be. Owing to the mechanical preload of the crystal assembly in the embodiment shown in FIG. 3, tensile stressing is possible up to the limit where the preload is neutralized.

Other forms of the crystal elements are possible also, e.g. rectangular cross section or cuboid or cubic shape. A rod crystal of segmental cross section has the advantage that the charges of the metallized outer surfaces can be transmitted directly onto a cylindrical preloading sleeve 3 (FIG. 3), avoiding contact problems.

The leads to the individual electrodes are gathered together in the cable 13 and led to the amplifier housing 15. Fitted in this are the four charge amplifiers 14, also the two difference units 16 and the summing unit 17. These components are wired as shown, so that the desired force components Fy, Ft and Fz are available at the output. With bigger embodiments, such as dynamometers according to FIG. 14, the entire evaluation circuitry can be accommodated inside the force transducer of the measuring arrangement.

FIG. 7 shows an application of the measuring arrangement according to the invention as a joystick, typically for manual control of movement mechanisms. The measuring arrangement 18 is mounted on a base 19. A clamping sleeve 20 merges into the force connection 21, on which an extension 22 is mounted, ending in a knob 23. The forces in the x-y plane act through the lever arm l on the measuring arrangement 18. If desired, the joystick can be equipped also for three components, i.e. for the axial z component in addition.

Figure 8:
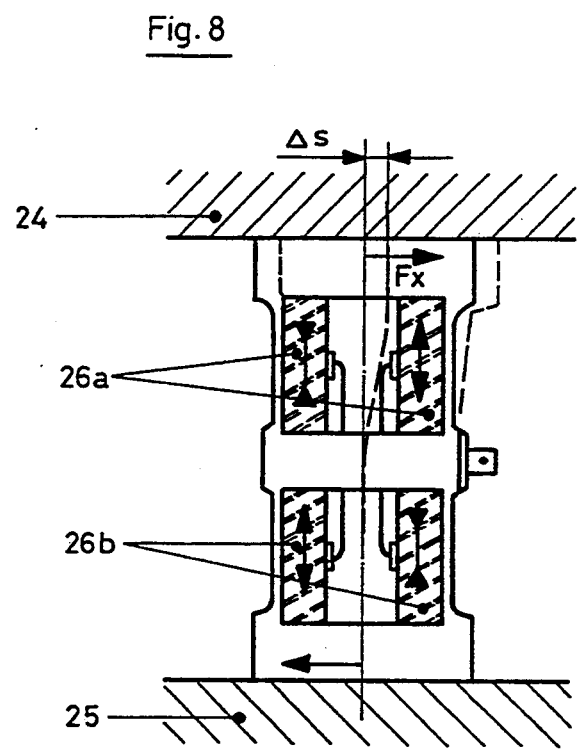
FIG. 8 Embodiment with a double measuring arrangement between two parallel plates.

FIG. 8 shows a double arrangement between two parallel-guided force plates 24 and 25. The two crystal assemblies 26a and 26b each have one pair of piezoelectric crystals. Besides shifting the plate 24 by the displacement Δs, a parallel force Ft sets up opposed moments in the assemblies, which can be summed in the signal processing. Of course it is also possible to provide an additional crystal pair as in FIG. 4, for moment forces in the direction of the y axis.

Figure 9:
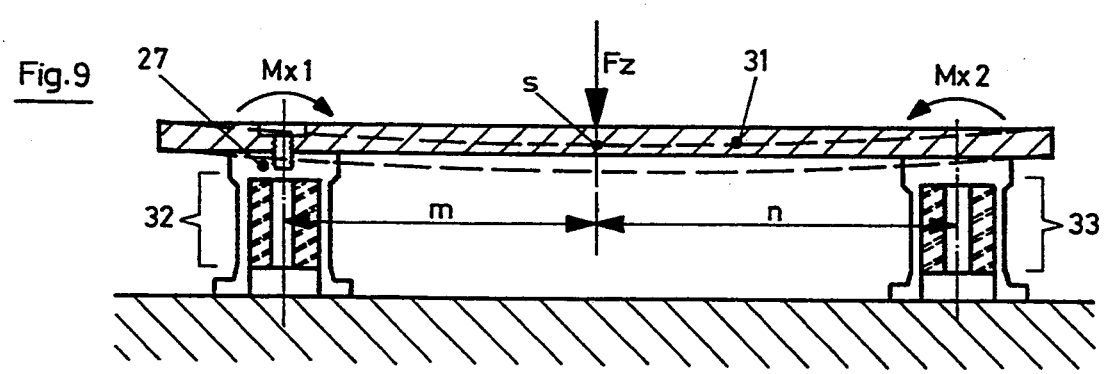
FIG. 9 Dynamometer arrangement with elastic top plate.

FIG. 9 shows a platform beam 31 with relatively thin, elastic cross section as an example. Under the influence of force Fz the beam 31 flexes by the amount "s". This flexure sets up the moments Mx1 and Mx2 in the two force moment transducers via the transmission part 27. The application point of force Fz and its distances m, n from the axes of the multicomponent transducer can be represented by simple computational relation. Such arrangements can be of advantage in lightweight biomechanics platforms with three to four force moment transducers 32, 33.

Figure 10:
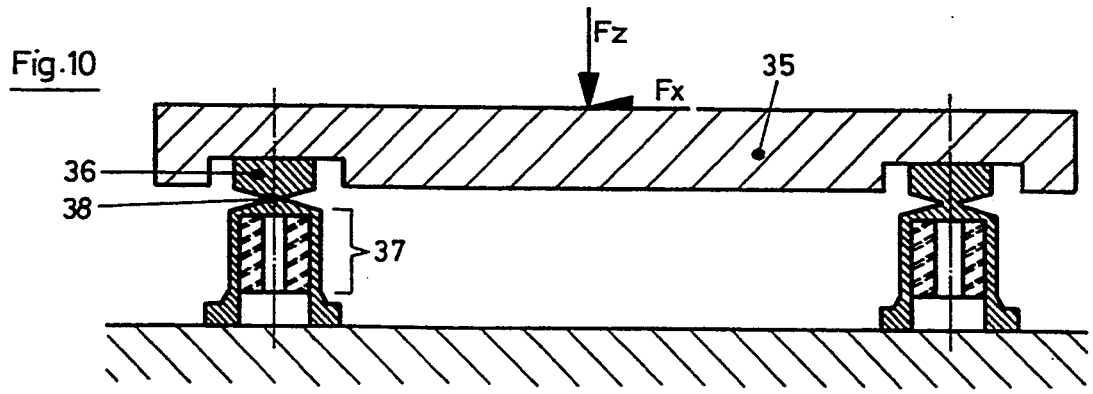
FIG. 10 Dynamometer arrangement with rigid top plate.

In contrast to FIG. 9, FIG. 10 shows a rigid platform beam 35 which undergoes virtually no flexure when loaded with the force Fz. To enable shear forces to be measured, an elastic constriction 38 is provided between force moment transmission part 36 and transducer 37. In this way it is possible to measure the force Ft acting on the beam. An arrangement of this kind may also be interesting for a biomechanics platform with three or more transducers 37.

Figure 11:
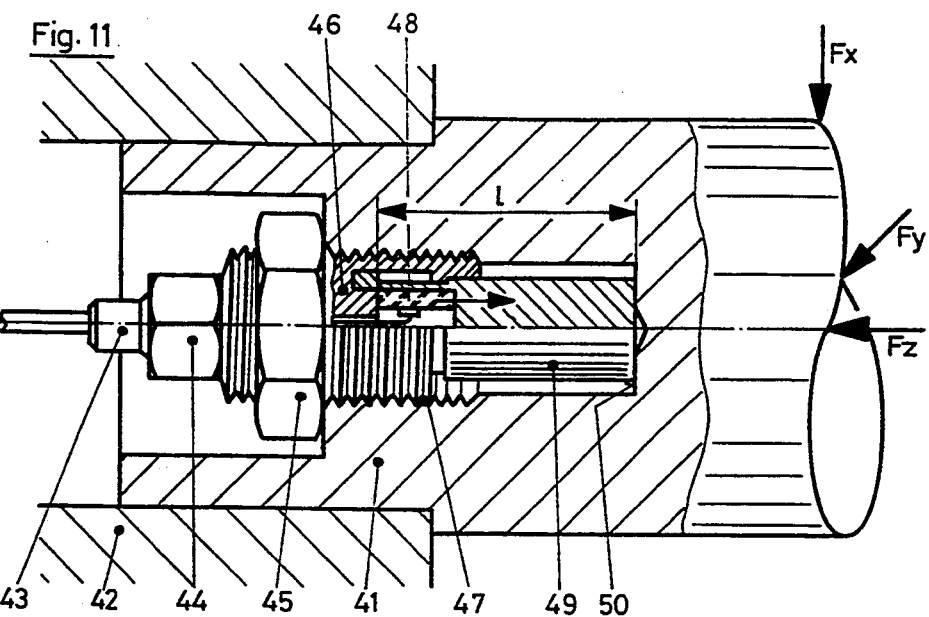
FIG. 11 Measuring arrangement according to the invention for fitting in machine columns as strain transducer.

FIG. 11 shows a measuring arrangement according to the invention for use as multicomponent strain transducer. For this purpose the force moment transducer must be calibrated appropriately. The application shown is particularly suited for fitting in the axes of machine columns, such as the tie bars on injection moulding machines, metal forming machines etc. In cyclic operations for example, the flexures due to eccentric force applications can be measured. In the typical embodiment shown, a force transmitting end 41 of a machine column is joined to a machine yoke 42 in the familiar manner. A force moment transducer 43 is threaded rigidly in a prepared hole by fitting and positioning hexagon 44, and positioned directionally to the x and y axes. This position is secured with a lock nut 45. The measuring base 46 is thus anchored firmly in the machine column, with the mounting thread 47 suitably isolated mechanically from the measuring base 46. A crystal set 48 is under mechanical preload set up by a clamping element 49, which is in frictionless press contact with a press fit surface 50. The press fit surface 50 may be plane, spherical or conical and the forces Ft, Fy and Fz are measured on this surface and evaluated as strains.

Figure 12:
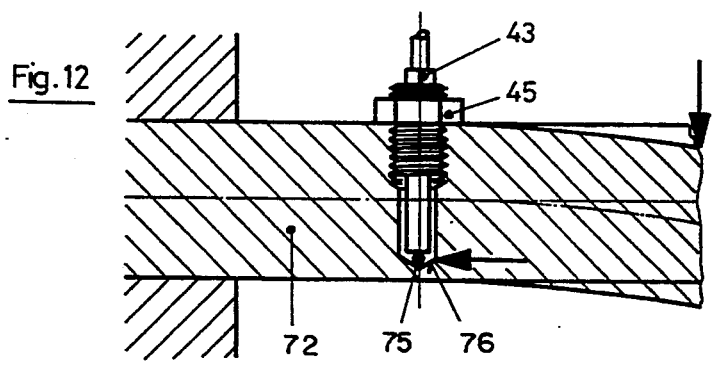
FIG. 12 Measuring arrangement according to FIG. 11 for fitting in a plate.

FIG. 12 shows the same transducer 43 as in FIG. 11, fitted in a plate-shaped arrangements 72. The force is transmitted through the interacting ball 75 and conical surface 76, which are arranged outside the neutral or center axis of the plate 72.

Multicomponent force moment measuring arrangements of this kind enable a new metrological approach to complex objects such as vehicle wheels, where the driving, steering and braking moments in dynamic driving tests can be evaluated by means of special dynamometers.

Figure 13:
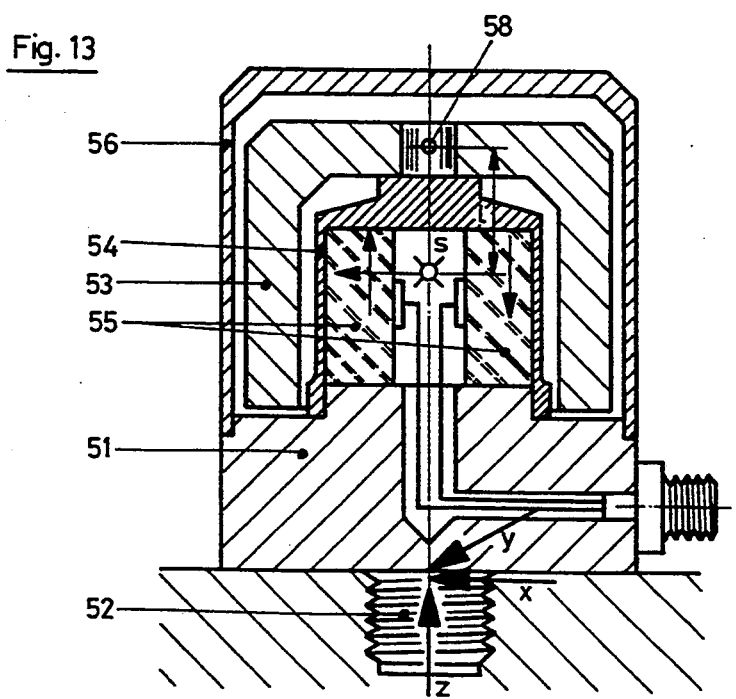
FIG. 13 Measuring arrangement according to the invention as three-component accelerometer.

FIG. 13 shows a three-component measuring arrangement for measuring acceleration. The assembly is fixed on the measuring point by means of a mounting body 51 and mounting screw 52. A bell-shaped mass 54 encloses a crystal array 55 and a clamping sleeve 53. with a housing cover 56 the transducer is enclosed from the outside. The centre of gravity "S" of the mass 54 is displaced from the force introduction element 58 by the lever length "L".

The function is surprisingly simple: In the acceleration directions x and y, the inertia acts through the centre of gravity "S" as a moment on the crystal array 55. In the z direction the inertia force acts directly and uniformly on the entire crystal array.

Figure 14:
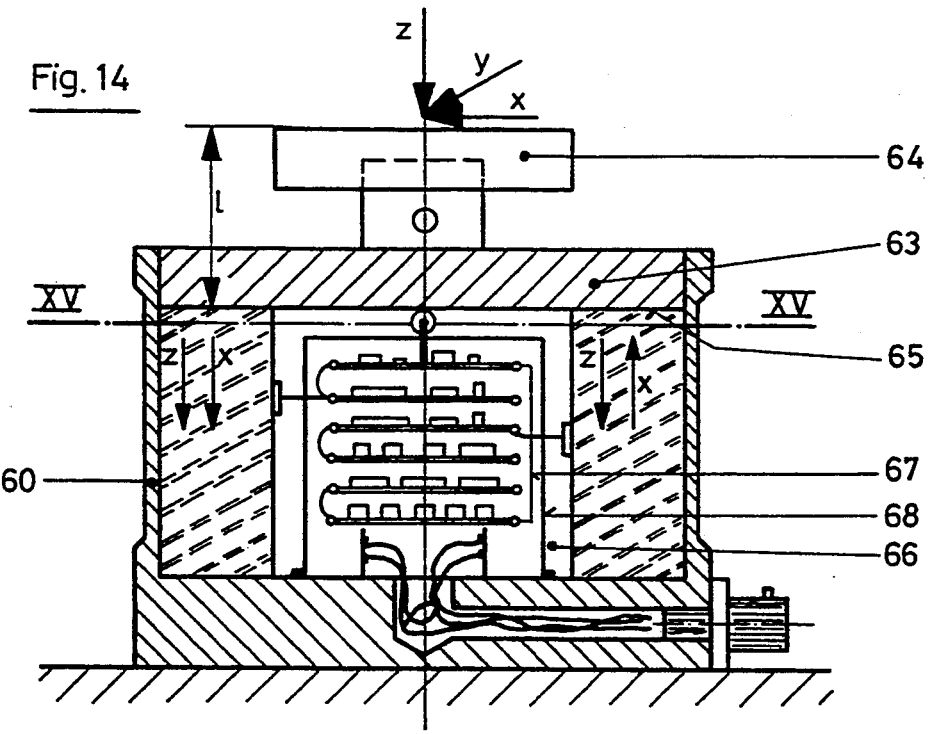
FIG. 14 Another embodiment of the measuring arrangement according to the invention as dynamometer.
Figure 15:
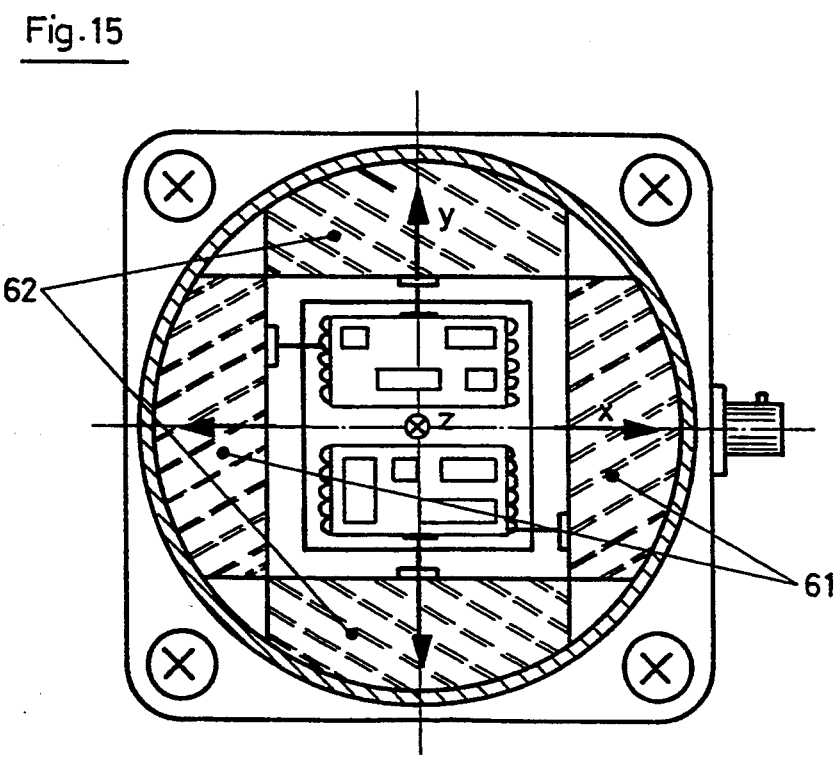
FIG. 15 Cross section at the line XV—XV in FIG. 14.

FIGS. 14 and 15 show a dynamometer, typically for micromachining. The crystal pairs 61, 62 are under mechanical preload, set up by the clamping sleeve 60 through the top plate 63. Mounted on the top plate 63 is a machining table 64, on which the microparts to be machined are mounted. The lever arm "L" is formed between the table surface and the moment introduction surface 65. The cuboid cavity 66 formed by the crystal pairs 61, 62 can be exploited to advantage for accommodating the electronic evaluation circuitry 67, which is located inside the shielding cage 68. This is made possible especially by the fact that all individual amplifiers, as well as the summing units and difference units, are placed singly on standardized printed circuit boards and can be produced in large quantities at low cost for other applications also.

The cross section in FIG. 15 shows the segmental crystals 61, 62 cut transversely out of the quartz rods, which for example when loaded yield negative charges on the plane inner surface and positive charges on the cylindrical outer surface. Provided the other crystal of the same pair under the same load again yields negative charges on the plane inner surface and positive ones on the outer surface, a crystal pair of unlike polarity is involved. In many cases, however, a crystal pair of unlike polarity may find use. The partner crystal then has the cylindrical cut on the negative side in the familiar manner.

In the embodiments of the measuring arrangement according to the invention, moment and axial forces can be processed simultaneously. The axial forces are summed or subtracted within the crystals, and the resulting addend is transmitted as signal charge to the measuring electrodes, from which it is led into the evaluation circuitry. Here an arrangement according to the invention is suitable for assembling multicomponent force transducers, which are suited above all for miniaturization and yield a high signal level for small forces and moments. Moreover they can be calibrated for strain measurement.

In this way a number of new applications become possible, which previously could not be realized. Some of them are illustrated in the figures, but other additional applications are feasible.

We claim:

1. A multicomponent force and moment measuring arrangement comprising:
   at least one pair of rod-like shaped piezoelectric elements spaced from each other along a first axis and sensitive to compressive and tensile forces parallel to a second axis, orthogonal to said first axis;
   common force and moment introduction means for introducing common compressive and tensile forces in said one pair of piezoelectric elements for forces along said second axis and introducing compressive forces in one and tensile forces in the other one of said piezoelectric elements of said one pair for a bending moment produced by forces along said first axis;
   means for providing a charge signal from said piezoelectric elements; and
   an evaluation circuitry connected to said providing means for producing a signal representing a force along said second axis and a signal representing a bending moment produced by forces along said first axis from the charge signals from said least one pair of piezoelectric elements.

2. Multicomponent force and moment measuring arrangement according to claim 1 wherein the piezoelectric elements have their longitudinal axis parallel to said second axis.

3. Multicomponent force and moment measuring arrangement according to claim 1 wherein the piezoelectric elements are quartz crystals cut transversely and machined so that they yield no charges at the force and moment introduction points, whereby the quartz crystals have parallel transverse axes within the measuring arrangement.

4. Multicomponent force and moment measuring arrangement according to claim 1, wherein the piezoelectric elements consisting of piezoelectric ceramic with corresponding polarity.

5. Multicomponent force and moment measuring arrangement according to claim 1, including plural pairs of piezoelectric elements arranged orthogonally to each other and parallel to said second axis so that a bending moment formation is obtained within an orthogonal coordinate system.

6. Multicomponent force and moment measuring arrangement according to claim 5, wherein said evaluation circuitry includes four charge amplifiers connected to said providing means and two difference units and one summing unit connected to said charge amplifiers.

7. Multicomponent force and moment measuring arrangement according to claim 1, including plural piezoelectric elements disposed so that a moment formation is obtained within a non-orthogonal system.

8. Multicomponent force and moment measuring arrangement according to claim 1, wherein the piezoelectric elements have a segmental cross section.

9. Multicomponent force and moment measuring arrangement according to claim 1, wherein said evaluation circuitry includes at least two charge amplifiers connected to said providing means and at least one difference unit and at least one summing unit connected to said charge amplifiers.

10. Multicomponent force and moment measuring arrangement according to claim 1, wherein said arrangement is constructed as a dynamometer including a housing in the form of a clamping sleeve; said evaluation circuitry is accommodated inside a shielding inside a space surrounded by said piezoelectric elements; and said providing means includes electrodes directly connected to a corresponding charge amplifier of said evaluation circuitry.

11. Multicomponent force and moment measuring arrangement according to claim 1, including an elastic beam platform with at least two measuring arrangements for detecting individual forces; and said evaluation circuitry ascertains the application point of the sum force from the determination of the compressive and tensile forces set up by the moment forces.

12. Multicomponent force and moment measuring arrangement according to claim 1, including a rigid beam platform with at least two measuring arrangements with the force and moment introduction means of each measuring arrangement having an elastic constriction linked elastically to the platform.

13. Multicomponent force and moment measuring arrangement according to claim 1, including means for calibrating said arrangement as an extensometer for measuring longitudinal and flexural forces.

14. Multicomponent force and moment measuring arrangement according to claim 1, wherein said introduction means is a joystick, whereby control commands may be inputed in two or three components.

15. Multicomponent force and moment measuring arrangement according to claim 1, wherein said arrangement is designed to determine accelerations in at least one axial direction of the coordinate system and includes a seismic mass surrounding the piezoelectric elements like a bell and the acceleration forces at the centre of gravity of said seismic mass acts on the force and moment introduction means through a lever arm.

16. A multicomponent force and moment measuring arrangement comprising:
   at least one pair of piezoelectric elements spaced from each other along a first axis and sensitive to compressive and tensile forces parallel to a second axis, orthogonal to said first axis;
   common force and moment introduction means for introducing common compressive and tensile forces in said one pair of piezoelectric elements for forces along said second axis and introducing compressive forces in one and tensile forces in the other of said piezoelectric elements of said one pair for a bending moment produced by forces along said first axis;

means for providing a charge signal from said piezoelectric elements; and
an evaluation circuitry located inside a free space between the piezoelectric elements and comprising at least two charge amplifiers connected to said providing means and at least one difference unit and at least one summing unit connected to said charge amplifiers.

* * * * *